United States Patent Office 2,883,290
Patented Apr. 21, 1959

2,883,290

CERAMIC CAPACITORS

George Victor Planer, Richmond, and Robert William Windebank, Hanworth, England, assignors to Sprague Electric Company, North Adams, Mass., a corporation of Massachusetts No Drawing. Application February 9, 1955
Serial No. 487,214

3 Claims. (Cl. 106—39)

This invention relates to materials for use as the dielectrics of electrical capacitors and more particularly to low voltage ceramic capacitors having greatly increased capacitance values per unit thickness of dielectric material.

The advent of transistor circuitry into the electronic field has brought a radical change in the operational requirements for many electrical components. Coupled with the previous existing philosophy of miniaturization of components is the realization that the device is to be subjected to relatively low potentials under operation. It is difficult, however, to fabricate these ceramic capacitor dielectrics into minimum dimensions of thickness which would satisfactorily operate under the low electrical potentials imposed by transistor circuitry rather than a larger maximum stress determined by the minimum thickness practical to make in an inexpensive manner. Such minimum thickness is dictated by the consideration that thin ceramic disks are extremely fragile and the least mechanical stress will cause fracture of the disk and electrical breakdown of the device.

It is therefore an object of the invention to overcome the primary and related disadvantages of the prior art. It is a further object of this invention to produce a low voltage capacitor whose capacity per unit volume is increased by factors of 200 to 300% compared to that available with presently known dielectrics. It is a still further object of this invention to produce an electrostatic capacitor of increased capacitance per unit volume and which is mechanically sturdy. Still further objects of this invention will become apparent from the following specification and appended claims.

The objects herein have been accomplished in accordance with this invention by the production of a capacitor utilizing a dielectric material comprising a high dielectric constant ceramic containing dispersed discrete particles of an electrical conductor. In a more limited sense the objects above have been achieved in accordance with this invention by the preparation of a low voltage ceramic mixture comprising a sintered body of a barium titanate-containing dielectric having dispersed therethrough a minor amount of particles of a platinum metal. A preferred embodiment of the invention has particles of platinum or palladium dispersed throughout a high dielectric constant barium titanate-containing body resulting in an increase in effective capacitance by factors in excess of 300%.

As indicated in the foregoing, this invention combines the mechanical strength of relatively thick, high dielectric constant ceramic disks with what is believed to be functional equivalent of reduction of thickness of the dielectric layer between the electrodes so as to obtain a remarkable increase in the actual capacitance of the device. By dispersing the particles of the conductor throughout the ceramic mix and thereafter firing the body to the desired configuration, a substantial increase in overall capacity is obtained. The conductor particles should remain as discrete particles within the sintered ceramic body and should not be oxidized or otherwise converted to non-conductive material. Apparently in retaining their discrete character an unexpectedly large percentage of conductor may be added to the sintered body without suffering excessive reduction in breakdown strength yet achieving much increased capacitance values. The conductor particles added to the ceramic should not be too diffusible at the sintering temperature which is generally about 1100 to 1400° C. since excessive diffusion tends to produce a low resistance body rather than one having the high leakage resistance needed for satisfactory capacitors.

The high dielectric constant ceramic bodies of the present invention are primarily mixtures of barium, strontium, magnesium, and lead titanates. For purposes of this disclosure a high dielectric constant material has, after firing, a dielectric constant above about 500 and extending to 6000 and higher. Compounds in addition to those mentioned above which may be used successfully either by themselves or in combination with others to make the desired ceramic, include calcium titanate and in general, titanates, zirconates and stannates of the metals of group 2, as well as of lead and bismuth. Mixtures of two or more of the aforesaid titanates are suitable for utilization as dielectric bodies within the teachings of this invention. In addition to the titanate materials it is to be understood that other compounds may be added to the mixture of titanates to vary their electrical properties for a particular application. Compounds suitable for this purpose are the oxides of zinc, magnesium, barium, strontium, silicon, lead, and other elements of groups 2, 3, 4, 5 and 6 of the periodic table. For example, barium oxide, when incorporated in a mixture of barium titanate and strontium titanate shifts the temperature-dependent peak dielectric constant point to a higher temperature, without at the same time materially decreasing the average or overall dielectric constant.

Those conductors found most suitable for this invention are the platinum metals which include platinum, palladium, iridium, rhodium, ruthenium and osmium. These materials apparently have such low diffusion rates at a firing temperature of 1350° C. for example, that they retain their discrete structure when incorporated into such a fired body as finely divided particles. Their melting points range between about 1550° C. for palladium to about 2700° C. for osmium. Platinum and palladium apparently diffuse even less than the rest of the members of this family. This is rather remarkable inasmuch as platinum and palladium have the lowest melting points of the entire family, and these melting points are only about 200° C. or so above the firing temperature. Palladium is particularly outstanding in that it provides the best electrical characteristics, particularly the increase in capacitance. The firing or sintering of the present invention can be carried out in a slightly oxidizing atmosphere such as ordinary air. However, for metals other than platinum or palladium, it is preferable to have a neutral or even slightly reducing atmosphere. For final bodies that are not more than about 15 mils thick, the metal particles should be 50 microns or less in size, that is, substantially the size of the ceramic particles. Palladium black or chemically produced "blacks" of the other metals are suitable. The concentration of conductors which can be added to the ceramic body without materially reducing the leakage resistance is generally less than about 30% by weight. At least about 5% addition is generally needed to provide an appreciable increase in dielectric constant. With such additions the effective capacitance is increased to three times the capacitance and may be even greater than 300% of the capacitance of an identically sized body of material not having the conductor disposed within.

The firing temperature and time used to produce the novel dielectrics are substantially those of the prior art. A temperature in the neighborhood of 1350° C. and times approximating one hour are found quite satisfactory. The firing of the body may also be utilized to effect chemical reactions to form the desired ceramic materials. By way of example, barium titanate is readily formed by firing an intimate mixture of barium carbonate and titanium dioxide. Where desired the effects of diffusion can be counteracted by keeping the firing times on the short side, not over one hour for instance. Cooling is preferably accomplished without quenching the sintered bodies by exposure to air or liquid at room temperature. The materials to be fired can be ground and intimately mixed by standard procedures such as a ball mill and thereafter compression-molded with or without a volatilizable binder into the particular dimensional configuration desired prior to firing.

As examples of this invention, the effects of various amounts of palladium, 15% to 30%, added to high dielectric constant mixtures are given. The finely divided, 50 micron or less, ingredients including the metal particles were weighed and thoroughly mixed, after which a binder of paraffin was added from a solution in benzene, disks 12 mils thick and ½ in. diameter were pressed from this mixture and thereafter fired. This firing was conducted at a temperature of 1350° C. for a period of one hour after which the bodies were allowed to cool without air quench. Electrodes were added to the fired disk by silk screening with silver paint and refiring at 900° C. For a body prepared as above from pure barium titanate having a dielectric constant at room temperature of 1200, the capacity was increased by factors varying between 2.2 and 3.0 when palladium within the range of 20 to 25% by weight was added to the compositions. A barium titanate-strontium titanate body (80:20 by weight) having a dielectric constant of 3800 showed similar percentage increase of capacity. With a body of slightly high dielectric constant, 15% of palladium resulted in a capacitance increase of approximately 150%. Larger or smaller increases can be obtained depending upon the quantity and particle size of the bodies incorporated, if comparable conditions of preparation of the composition are carried out. Fine particles of metal apparently tend to give somewhat larger increases. Similar results are achieved with additions of the other members of the platinum family or alloys or mixtures of the platinum metals with each other. Alloys of the platinum metals with other metals, such as gold and silver, particularly those having melting points of about 1400° C. or higher can, also be used as well as other conductive materials of similar high melting point. An alloy of 60% gold and 40% platinum by weight has a melting point of about 1500° C. and is suitable.

To further illustrate the invention, the following table is representative of the dielectric characteristics of a barium titanate-strontium titanate-calcium titanate (75:20:5 by weight) body having a normal dielectric constant of about 3000, admixed with 25% of palladium powder, when subjected to variations of temperature.

| Temperature ° C.: | Equivalent K [1] |
|---|---|
| 20 | 8400 |
| 40 | 9500 |
| 50 | 9750 |
| 80 | 7900 |
| 100 | 6200 |
| 110 | 5700 |

[1] Dielectric constant computed on the basis of the capacity of the body. A similar capacitor not having the metal powder added had, at 25° C., a capacity such that the dielectric constant was computed to be 3000.

In the application of electrodes to the fired bodies of the present invention, care should be taken that no low-melting alloys are formed between the electrode material and the conductive filler or if formed are not melted. It is accordingly desirable to deposit electrodes by vacuum distilling or cathode sputtering directly in place. Low melting metals such as tin, copper or zinc can be readily applied in this way.

While the use of high dielectric constant ceramics is considered particularly advantageous since it enables extremely high capacity values to be attained for a given size of capacitor, the teaching of this invention has application to other materials such as titanium dioxide which has a smaller dielectric constant but which will also show an increase.

As many apparently widely different embodiments of this invention may be made without departing from the spirit and scope hereof, it is to be understood that the invention is not limited to the specific embodiments hereof except as defined in the appended claims. For example, instead of distilling or sputtering on the electrodes, a layer of colloidal platinum paint can be applied and heated to 400° C. to make a very effective electrode.

What is claimed is:

1. In a ceramic capacitor, a ceramic dielectric material consisting essentially of a compound selected from the class consisting of titanates, zirconates and stannates of a metal selected from the class consisting of barium, strontium, calcium, lead, zinc, magnesium and cadmium having a dielectric constant of from 500 to 6000 and a forming temperature of from 1100 to 1400° C., and particles of a metal of the platinum group of less than 50 microns in size dispersed in said ceramic in an amount of from 5 to 30% by weight, said particles being of a discrete character in said formed ceramic.

2. In a ceramic capacitor, a ceramic dielectric material consisting essentially of a compound selected from the class consisting of titanates, zirconates and stannates of a metal selected from the class consisting of barium, strontium, calcium, lead, zinc, magnesium and cadmium having a dielectric constant of from 500 to 6000 and a forming temperature of from 1100 to 1400° C., and particles of platinum metal of less than 50 microns in size dispersed in an amount of from 5 to 30% by weight, said particles being of a discrete character in said formed ceramic.

3. In a ceramic capacitor, a ceramic dielectric material consisting essentially of a compound selected from the class consisting of titanates, zirconates and stannates of a metal selected from the class consisting of barium, strontium, calcium, lead, zinc, magnesium and cadmium having a dielectric constant of from 500 to 6000 and a forming temperature of from 1100 to 1400° C., and particles of palladium metal of less than 50 microns in size dispersed in an amount of from 5 to 30% by weight, said particles being of a discrete character in said formed ceramic.

References Cited in the file of this patent

UNITED STATES PATENTS

| 2,027,277 | Habann | Jan. 7, 1936 |

FOREIGN PATENTS

| 869,310 | Germany | 1953 |